United States Patent [19]

Dlugos et al.

[11] 4,122,526
[45] Oct. 24, 1978

[54] CALCULATING AND POSTAL ZIP CODE-TO-POSTAL ZONE CONVERTING APPARATUS

[75] Inventors: Daniel F. Dlugos, Huntington; Flavio M. Manduley, Seymour, both of Conn.

[73] Assignee: Pitney-Bowes, Inc., Stamford, Conn.

[21] Appl. No.: 752,012

[22] Filed: Dec. 20, 1976

[51] Int. Cl.² .................................... G06F 15/20
[52] U.S. Cl. ........................................... 364/705
[58] Field of Search ............... 235/156, 152; 364/900, 364/705, 715; 177/25

[56] References Cited

U.S. PATENT DOCUMENTS

| | | | |
|---|---|---|---|
| 3,635,297 | 1/1972 | Salava | 177/5 |
| 3,816,730 | 6/1974 | Mititaka et al. | 235/156 |
| 3,816,731 | 6/1974 | Jennings et al. | 235/156 |
| 3,938,095 | 2/1976 | Check, Jr. et al. | 364/900 |
| 3,995,123 | 11/1976 | Wilson | 235/156 X |
| 4,002,892 | 1/1977 | Zielinski | 235/156 |

Primary Examiner—David H. Malzahn
Attorney, Agent, or Firm—Donald P. Walker; William D. Soltow, Jr.; Albert W. Scribner

[57] ABSTRACT

An apparatus for performing mathematical calculations and for converting postal zip code information into postal zone information comprises a mathematical logic circuit which is programmed to perform mathematical calculations. A converter circuit, incorporated in the apparatus in removable, replaceable, modular form, is programmed to determine the postal zone designating each of a plurality of specific geographical destinations of mail as a function of the zip code associated with each of the geographical destinations. Since the postal zone associated with each destination zip code is also a function of the location from which mail originates, the converter logic circuit is programmed to perform the determination for a specific originating location. The apparatus may be adapted for use at different originating locations by substituting an appropriately programmed modular converter logic circuit for one which is inappropriately programmed. Alternatively, the converter logic circuit may be reprogrammed while interfaced with the remainder of the apparatus. A switching device is also provided for selectively operating the apparatus in a calculator mode or in a zip code-to-zone conversion mode.

11 Claims, 14 Drawing Figures

CALCULATING AND POSTAL ZIP CODE-TO-POSTAL ZONE CONVERTING APPARATUS

BACKGROUND OF THE INVENTION

1. Field of the Invention

The present invention relates to an apparatus which performs both mathematical calculations and postal zip code-to-postal zone conversions. This apparatus may be used by individuals or commercial users to make mailing parcels and priority mail easier.

The United States Postal Service has established a system for numerically identifying each postal delivery area in the country. Known as the Zone Improvement Plan (ZIP), the system assigns a five digit number (the zip code) to each post office in the United States. The first three digits of each zip code designation, called the zip code prefix, identify the sectional center facility of the postal address. The assignment of each zip code to an area is both arbitrary and permanent.

The Postal Service has also established a system of eight zones for calculating the postage required to mail parcels and priority mail from any given location to any other location in the country. The zone system is generally based on the distance between the location from which mail originates to its destination. Therefore, postal zone designations are not merely a function of the destination location but rather are a function of both origination and destination locations. One must know the point from which, for example, a parcel is mailed in order to determine the zone in which its destination falls and, hence, the postage required to mail the parcel.

Since all postal locations have a permanently assigned zip code, the postal destination zone is also a function of the zip codes of the point of origination and destination of applicable mail.

Through extensive publicity for and easily accessible information on the zip code system, the Postal Service has accustomed people to learn or obtain the zip code of the destinations for their mail. However, few people know which zone designates the destination of their mail. Therefore, the Postal Service publishes charts for approximately 600 mail origination locations which show destination zones as a function of the three digit prefix of destination zip codes. Other charts tabulate the postage as a function of different weight-zone combinations. A user must, therefore determine the proper zone for the destination of this parcel from one chart and, after weighing the parcel, determine the proper postage from the other chart.

The present invention makes this postage calculation operation easier and faster.

2. Description of the Prior Art

Postage calculating systems are known. For example, U.S. Pat. No. 3,635,297 (Salava) discloses a computer-type postage calculator in which the prefix of a destination zip code is converted to zone information through the use of a look-up table in which zones are stored as a function of zip code prefixes. The table is scanned in numerically ascending order until a correspondence is found between the destination zip code prefix entered by the user and one of the addresses in the table. Signals representing the parcel weight, destination zone and class of handling are algebraically handled. The computer is supposedly interfaced with a postage meter.

U.S. patent application Ser. No. 715,914 (Check et al.), filed Aug. 19, 1976 and assigned to the assignee of the present invention, discloses a system for automatically setting a postage meter as a function of package weight and destination. The system includes input means for generating weight-representing signals and input means for providing signals representing the destination zip code for the mail. Means for determining the destination zone as a function of the destination zip code using an incremental calculating method as well as means for computing the proper postage as a function of the weight-representing signal and a destination zone signal are incorporated in the system. A meter setting mechanism translates the calculated postage into positions of postage-printing wheels.

Both of the systems described above are best suited for use by those who handle medium to large volumes of mail. Because of their complexity and cost, they are not well suited for use by individuals and small businesses who handle moderate volumes of mail.

Another publication that discloses a device for converting zip code information to zone information is U.S. Pat. No. 3,692,988 (Dlugos et al.), assigned to the assignee of the present invention. The device is used in conjunction with a parcel postage metering system which is the main subject of patent.

SUMMARY OF THE INVENTION

In its preferred embodiments, to be described below in detail, the apparatus of the present invention for converting postal zip code information into postal zone information and for performing mathematical calculations is independent of other apparatus and compact as well as portable for ease of use. For example, the apparatus may be embodied in a size comparable to commercially available, hand-held mathematical calculators thereby permitting use by the general public.

In its preferred forms, the apparatus includes a mathematical logic circuit for performing mathematical calculations and a converter circuit for determining postal destination zone as a function of the postal destination zip code. A mode control switch selectively operates the mathematical logic circuit to operate the apparatus in a calculator mode or operates the converter circuit to operate the apparatus in a zip-to-zone conversion mode.

The converter circuit is modular in construction and is adapted to be removably attached to the remainder of the apparatus. Accordingly, converter circuits programmed for any of the 600 postal origination locations for which the Postal Service promulgates charts may be associated with the remainder of the apparatus so that it may be used throughout the country. Several forms of this modular construction and appropriate means for interfacing the converter circuit with the remainder of the apparatus are disclosed.

Accordingly, it is an object of the present invention to provide an independently operable, conveniently housed apparatus for performing both mathematical calculations and for converting zip code information into postal zone information which may be readily used by individuals as well as small organizations to speed handling of up to moderate volumes of mail.

Other objects, aspects, and advantages of the present invention will be pointed out and will be understood from the following detailed description provided below in conjunction with the accompanying drawings.

DETAILED DESCRIPTION OF THE PREFERRED EMBODIMENTS

Figure 1:
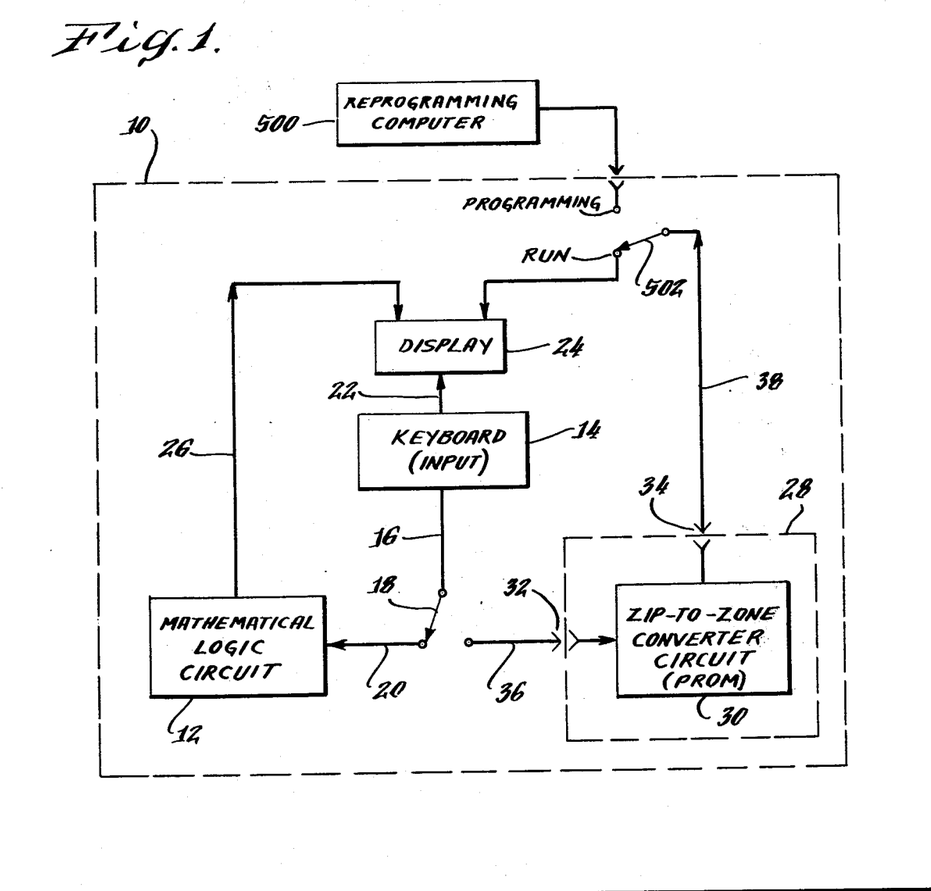
FIG. 1 is a block diagram of the apparatus of the present invention for converting postal zip code information into postal zone information and for performing mathematical calculations.

FIG. 1 illustrates the main components of the apparatus of the present invention for converting postal zip code information into postal zone information and performing mathematical calculations. This apparatus, generally indicated at 10, includes a mathematical logic circuit 12 which may either have a fixed program or be adapted for reprogramming to perform certain mathematical calculations. For example, the mathematical logic circuit 12 may be programmed to perform addition, subtraction, multiplication, and division, rootes, powers, or alternatively the logic circuit may be adapted for operator programming to perform more sophisticated scientific, financial, or similar calculations. Further, this circuit may be interfaced with one or more memories for storing entered numbers of the results of calculations.

The mathematical logic circuit 12 is operated by an input device in the form of a keyboard 14 which includes keys for the digits "0" through "9" as well as keys for actuating the program to perform the various mathematical functions within the capability of logic circuit 12. The keyboard is connected to the mathematical logic circuit through a line 16, a switch 18, and a line 20. The keyboard is also connected by a line 22 to a display 24 which may be of the light emitting diode (LED) or liquid crystal types and may also include a printing device. In this way, entries into the mathematical logic circuit are shown on the display. The mathematical logic circuit 12 is also connected to the display by a line 26 so that results of calculations performed thereby are also shown.

The apparatus of the present invention also includes a module 28 which includes a zip code-to-zone converter circuit 30. The module 28 interfaces with the remainder of the apparatus through jack plugs 32 and 34. Plug 32 is connected to a line 36 which is in turn connected to keyboard 14 through switch 18. Plug 34 is connected through line 38 to the display 24. Accordingly, the keyboard 14 is also used to enter information into the zip-to-zone converter circuit which is simultaneously shown on the display. Results of conversions performed by the circuit 30 are also shown on the display 24.

The zip code-to-zone converter circuit may employ a look-up table in which zones are stored as a function of zip code prefixes such as that disclosed in U.S. Pat. No. 3,635,297 (Salava). Alternatively, the converter circuit 30 may employ an incrementally arranged table such as that disclosed in U.S. patent application Ser. No. 715,914 (Check et al.) assigned to the assignee of the present invention. The operation of each of these alternative types of zip code-to-zone converter circuits will be explained in greater detail below.

The apparatus of the present invention may be selectively used in either a mathematical calculator mode or in a zip code-to-zone converter mode depending upon the position of switch 18. Moreover, the apparatus of the present invention is modular in design so that a zip code-to-zone converter circuit programmed appropriately for a given location of its user may be easily incorporated in the remainder of the apparatus. Should the user move or mail from another location, a differently programmed zip code-to-zone converter circuit may be substituted for that originally incorporated in the apparatus. Therefore, the apparatus of the present invention provides an individual or a small commercial user with the convenience of having a multifunction device which is completely portable as well as easily adaptable for use anywhere in the country.

Various embodiments of the apparatus of the present invention are disclosed in FIGS. 2 through 9. FIGS. 2 through 5 illustrate a first embodiment of the present invention. This embodiment includes a housing generally indicated at 40 which comprises an upper section 42 and a lower section 44 that are held together by any suitable means such as screws 46. The keyboard 14 and the display 24 are both mounted in the upper section 42 of the housing for easy accessibility and visibility. An on-off switch 48, which controls supply of power to the apparatus from a source such as a battery 84 (FIG. 4), is mounted between the keyboard and display for reciprocal sideward sliding movement.

The apparatus shown in FIGS. 2 through 5 is adapted to perform addition, subtraction, multiplication, and division by depression of keys 51a, 51b, 51c, and 51d, respectively. Further, the keyboard includes a key 50 marked "Z" which automatically actuates the mode control switch 18 to operate the apparatus in a zip code-to-zone converter mode. In the same manner, depression of any of the mathematical function keys 51a through 51c automatically actuates the mode control switch 18 to operate the apparatus in the calculator mode. Accordingly, operation of the apparatus in either mode is extremely simple and requires no presetting.

Figures 2, 3:
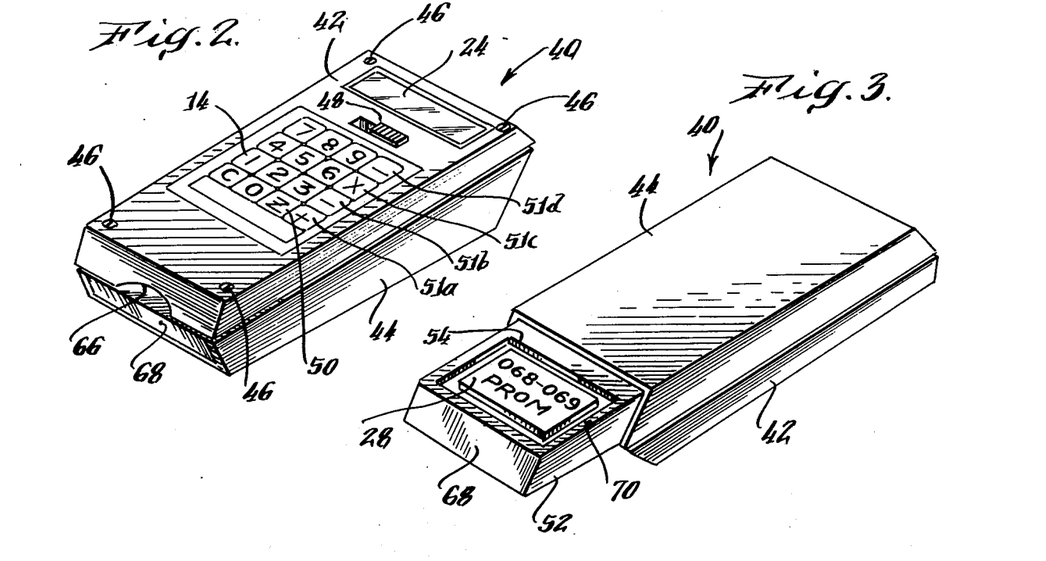
FIG. 2 is a perspective view looking downward from the right of the apparatus of the present invention in which the converter circuit module is interfaced with the remainder of the apparatus by means of a sliding tray jack arrangement.
FIG. 3 is a second perspective view of the bottom of this first embodiment. The sliding jack arrangement is shown in its open position.

As shown in FIG. 3, the housing 40 incorporates a sliding tray 52 which is retractable into the front of the lower section 44 of housing 40. This tray includes a compartment 54 for receiving the module 28.

Figure 4:
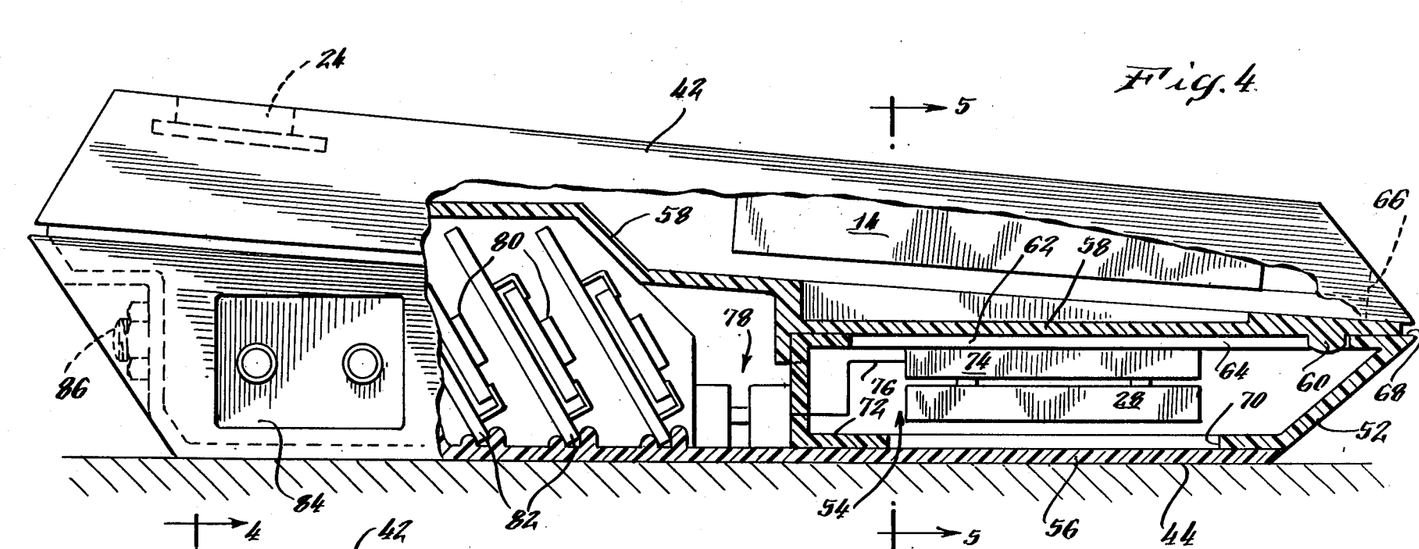
FIG. 4 is a side elevational view of the first embodiment shown partly in vertical cross-section taken through plane 4—4 in FIG. 5 looking toward the right.
Figure 5:
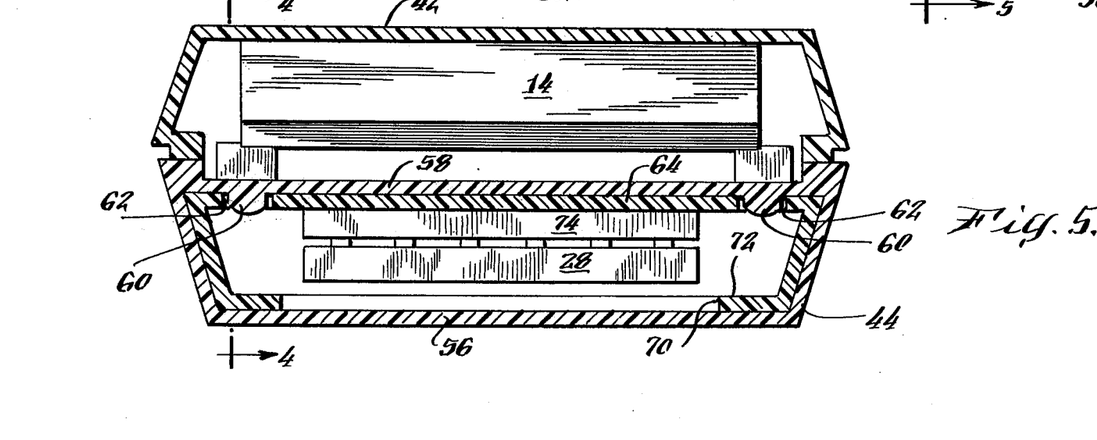
FIG. 5 is a vertical cross-section view of the first embodiment taken through plane 5—5 of FIG. 4 looking toward the right.

FIGS. 4 and 5 illustrate this first physical embodiment of the present invention and particularly the sliding tray 52 in greater detail. As can be seen in FIG. 4, the tray 52 is slidable between the bottom wall 56 of the lower housing section 44 and an intermediate wall 58 which is held between the upper and lower housing sections. A pair of retaining pins 60 formed with the intermediate wall 58 are received in complementary slots 62 formed longitudinally through the base 64 of the tray 52. A finger depression 66 is formed in the upper housing section to permit the leading edge 68 of tray 52 to be grasped and moved outwardly of housing 40. A rectangular opening 70 is formed in the top 72 of tray 52 to provide access to the compartment 54.

The base 64 of tray 52 also supports a socket 74 or jack into which the zip code-to-zone converter module 28 is plugged. A cable 76 connects the socket 74 to a plug arrangement, generally indicated at 78, which connects the socket to the remainder of the apparatus when the tray is in its retracted position (FIG. 4). Connection through plug arrangement 78 is broken when the tray is withdrawn from the housing (FIG. 3). Accordingly, the plug arrangement provides a convenient means for providing tray 52 with slidability without the necessity of flexing any cable connections.

Thus, as can be seen in FIGS. 3 and 4, one zip code-to-zone converter module may be removed from the apparatus and another may be substituted merely by withdrawing the tray from the apparatus housing and pulling the module from its socket. An appropriate module is merely substituted by reversing the operation and returning the tray to its retracted position.

The mathematical logic circuit may be embodied in a number of integrated circuit chips 80, each of which is in turn mounted on a printed circuit board 82, which are supported in the lower housing section 44 beneath intermediate wall 58. Further, as can be seen in FIGS. 4 and 5, the keyboard 14 and display 24 are mounted in the upper housing section above the intermediate wall 58.

A battery 84 is mounted behind printed circuit boards 82 in the lower housing section 44. The battery may be of either the replaceable or the rechargeable types. An input jack 86 is provided in the back of the lower housing to connect a recharger to the battery if it may be recharged.

Figure 6:
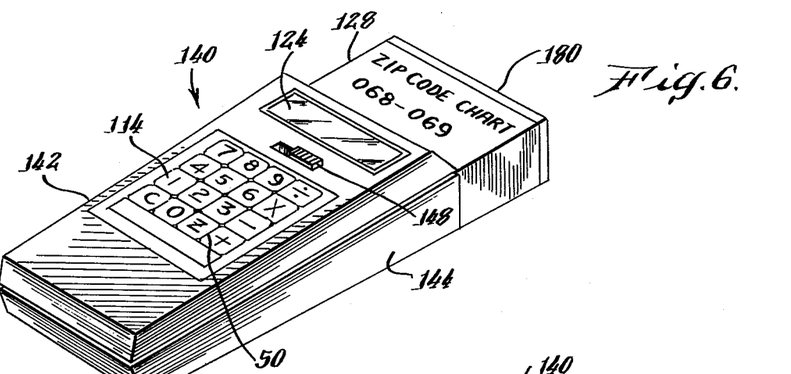
FIG. 6 is a perspective view of a second embodiment of the apparatus of the present invention which comprises an externally accessible converter module.
Figures 7, 8:
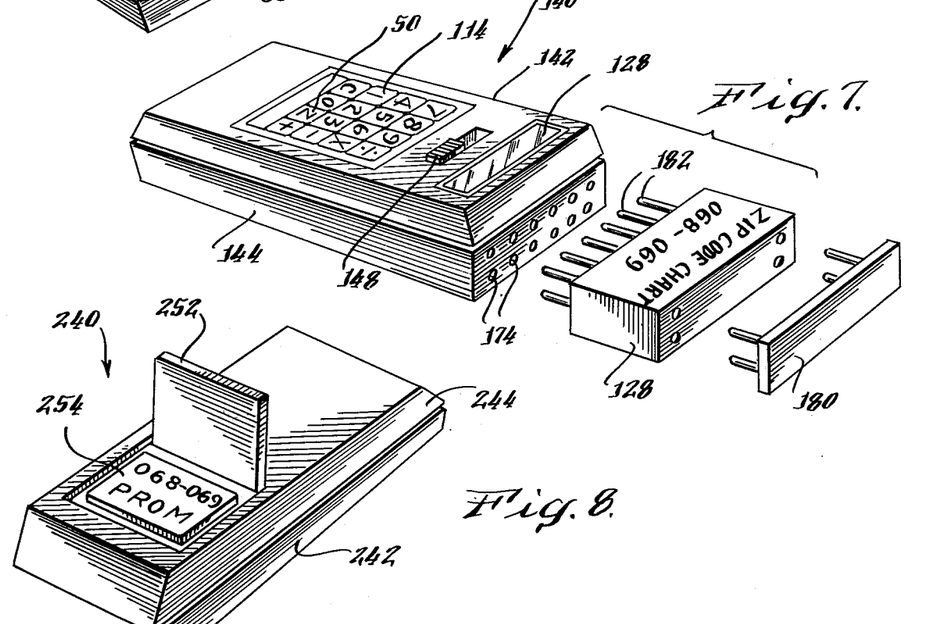
FIG. 7 is a second perspective view of the second embodiment.
FIG. 8 is a perspective view of the bottom of a third embodiment of the apparatus of the present invention in which the converter module is received through a hinged hatch.

A second embodiment of the present invention, shown in FIGS. 6 and 7, includes a housing, generally indicated at 140 comprised of an upper section 142 and a lower section 144. A keyboard 114 having a zip code-to-zone conversion key 50 is mounted in the upper housing section, as are an on-off switch 148 and a display 124. The housing differs from that described with reference to the first embodiment in that it does not have a sliding tray for receiving the zip code-to-zone converter module. Instead, as can be seen best in FIG. 7, an input jack socket 174 is mounted on the rear of the lower housing section 144 and the zip code-to-zone converter module 128 is provided with a series of plugs 132 which are accepted by the socket 174. Accordingly, the module is attached to the remainder of the apparatus externally and is therefore easily accessible. Moreover, the module forms an integral extension of the housing.

A dummy cover plate 180 is mounted on the back of the module. This plate covers the socket 174 when a module is not attached thereto. Accordingly, the apparatus looks very similar to a conventional calculator when not set up to do zip code-to-zone conversion.

Figure 9:
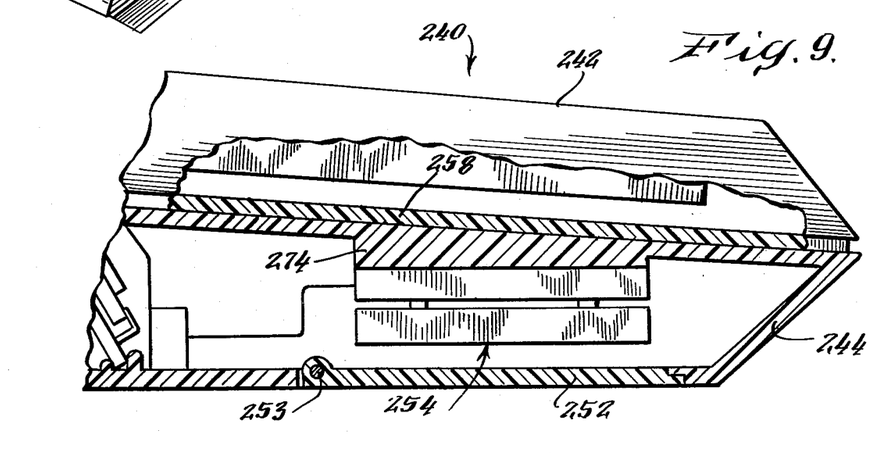
FIG. 9 is a cross-sectional vertical corss-sectional view similar to that shown in FIG. 4 illustrating the third embodiment of the present invention.

A third embodiment of the present invention is shown in FIG. 9. In this embodiment, the apparatus comprises a housing 240 having an upper section 242 and a lower section 244. The lower section is similar to that described with reference to the first embodiment with the exception of the fact that instead of a sliding tray, the housing has a hatch cover 252 hinged at 253, which provides access to a compartment 254. The zip code-to-zone converter module socket 274 is mounted directly on an intermediate wall 258 (FIG. 9) between the upper and lower housing sections 242 and 244. Further, the slidable plug arrangement 78 is eliminated since the socket 74 may be directly connected to the remainder of the apparatus without need for flexible electrical connections.

Other arrangements for providing modular construction for the interface between the zip code-to-zone converter module and the remainder of the apparatus may also be provided.

As noted above, the zip code-to-zone converter module may employ either a direct look-up table approach or an incremental or Δ ZIP approach to destination zip code-to-destination zone conversions. Each of these approaches will now be explained.

As noted above, the Postal Service generates a series of official zone charts for each mailing location in the country. A small portion of the official zone chart for use by mailers having originating zip codes 06801 through 06999, that is, the Stamford-Danbury area of Connecticut, is set forth in Table I below.

TABLE I

| Zip Code Prefixes | Zone |
|---|---|
| 006 – 009 | 7 |
| 010 – 018 | 2 |
| 019 | 3 |
| 020 – 025 | 2 |
| 026 | 3 |
| 027 – 031 | 2 |
| 032 – 033 | 3 |
| 034 | 2 |
| 035 | 3 |
| 036 | 2 |
| 037 – 043 | 3 |

(This information may be found in Zone Chart No. 068-069 published in May, 1969 by the United States Postal Service.) As can be seen from Table I, the first legal effective zip code prefix is 006. Zip codes having prefixes from 000 to 006 have been designated as not to be used by the U.S. Postal Service. Accordingly, 000 is the starting address of the zip code system, which is also, therefore, the initial address in the apparatus memory.

In the direct table look-up approach to zip code-to-zone conversion, each of the zone designations is stored at an address exactly corresponding to an appropriate zip code prefix in a suitable memory in the zip code-to-zone conversion circuit 30. The memory is preferably a programmable read-only memory (PROM). Accordingly, the zone 7 designation would be stored at an address corresponding, for example, to zip code prefix 006. Similarly, the zone 7 designation would also be stored in an address for zip code prefix 007. The zone 2 designation would be stored at an address corresponding to zip code prefix 010, as well as at additional addresses corresponding to each of the prefixes between 010 and 018. An error indication would be stored at an address corresponding to each of the prefixes designated not for use. The most effective way of implementing this direct look-up approach is by storing information in the PROM in binary form rather than binary coded decimal (BCD) form, that is, as it is entered from the keyboard.

Figure 10:
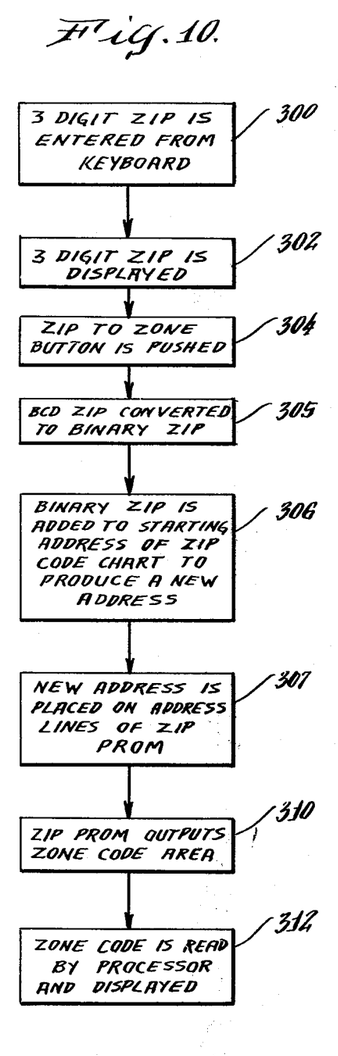
FIG. 10 is a flow diagram of operations performed by one form of the converter module of the present invention.

Accordingly, operation of the zip code-to-zone converter module using the direct look-up approach, which may be explained with reference to FIG. 10, begins by entering the three digit zip code prefix (in BCD form) of the destination of the user's mail on the keyboard. This is step 300. In step 302 the zip code prefix is shown on the display. Then, at step 304, the zip code-to-zone button is pushed to operate the apparatus in the zip code-to-zone converter mode. Simultaneously the three digit zip prefix is converted to its binary equivalent in step 305 and is added to the starting address of the zip code chart PROM, namely 000. This produces a new binary address in step 306. In step 308 the new binary address is placed on the address lines of the zip code-to-zone converter PROM which directly outputs the zone data in step 310. The zone code is then ultimately shown on the display in step 312.

The PROM used in the direct look-up table approach necessarily has approximately 1000 addresses, one for each three digit zip code prefix, be it valid or invalid.

The incremental approach to zip code-to-zone conversion makes use of the fact that certain groups of zip code prefix destinations are designated by the same zone to decrease the number of addresses necessary for storage in memory. Accordingly, this incremental or Δ ZIP approach establishes Δ ZIP values which are employed in the conversion process. To establish these Δ ZIP values, the zip code prefixes in each official zone chart are divided into group of those which are consecutively numbered and fall within the same zone. Table II, below, shows the Group No. and Δ ZIP values of the same zip code prefixes shown in Table I.

TABLE II

| Zip Code Prefixes | Zone | Group No. | Δ ZIP |
|---|---|---|---|
| 006 – 009 | 7 | 1 | 9 |
| 010 – 018 | 2 | 2 | 9 |
| 019 | 3 | 3 | 1 |
| 020 – 025 | 2 | 4 | 6 |
| 026 | 3 | 5 | 1 |
| 027 – 031 | 2 | 6 | 5 |
| 032 – 033 | 3 | 7 | 2 |
| 034 | 2 | 8 | 1 |
| 035 | 3 | 9 | 1 |
| 036 | 2 | 10 | 1 |
| 037 – 043 | 3 | 11 | 7 |

In Table II, the zip code prefixes 006 and 009 are consecutively numbered prefixes which fall within zone 7. These prefixes then are said to comprise Group No. 1. Subsequently, prefixes 010 through 018 are consecutively numbered and are within zone 2. The change in zone numbers requires that these prefixes be grouped separately into Group No. 2.

Δ ZIP values are defined as the difference between the numerical value of the highest zip code prefix in one group and the highest zip code prefix in the preceding group. Thus, by way of example, the highest zip code prefix in Group No. 7 in Table II is 033, while the highest zip code prefix for the preceding Group No. 6, is 031. The difference between 033 and 031 yields a Δ ZIP value of 2 for Group No. 7.

The Δ ZIP values and associated zone and group values are stored in a programmable read-only memory (PROM) in the same sequence in which they appear in Table II along with the remainder of all valid zip codes in the official zone chart.

The incremental approach to zip code-to-zone conversion makes use of the stored data by successively incrementing the zip code starting address with Δ ZIP values until the destination zip is equalled or exceeded. The number of incrementing steps is equal to the group number of the destination zip code which is then utilized to recall the zone in accordance with the data stored.

Figure 11:
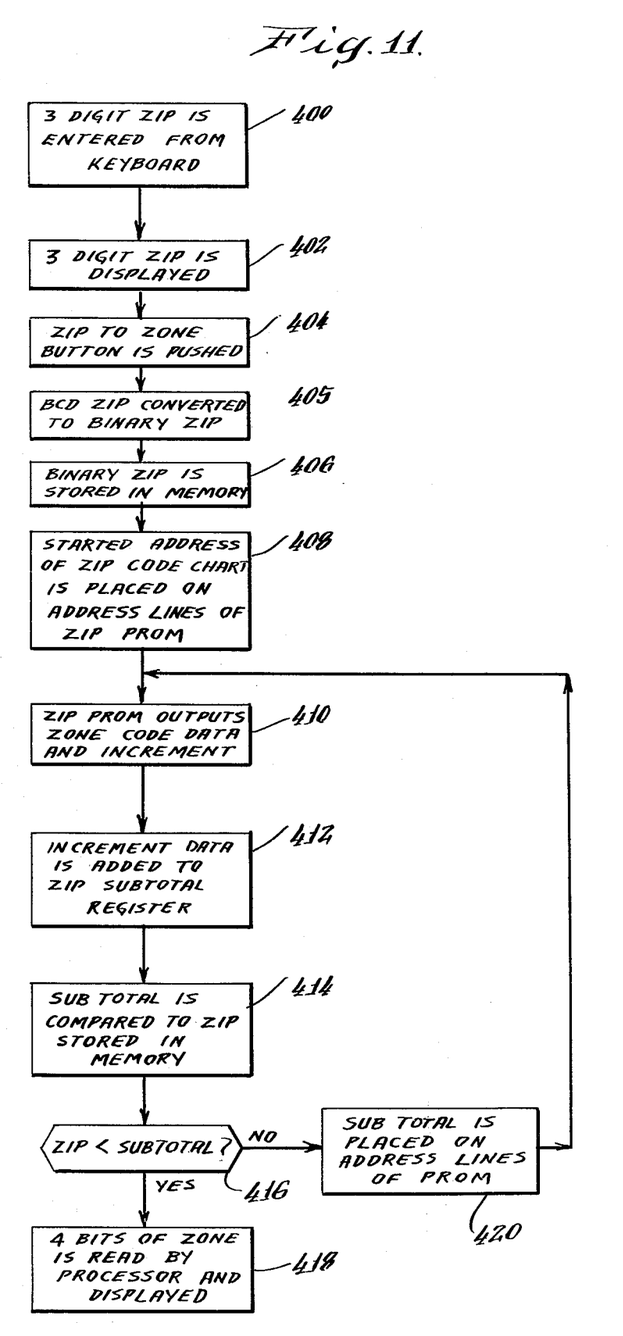
FIG. 11 is a flow diagram of operations performed by a second form of the converter module.

The incremental approach may be described with reference to FIG. 11 and Table II. In the first step 400 the three digit destination zip code prefix (in BCD form) is entered from the keyboard. In step 402 the destination zip prefix is loaded into the display. In step 404 the zip code-to-zone button is pushed. Simultaneously the three digit zip prefix is converted to its binary equivalent in step 405 and is then stored in memory in step 406. In step 408, the starting address of the zip code chart, 000, is placed on the address lines of the zip code PROM. In step 410, the zip PROM outputs the first Δ ZIP value which is then added to the zip sub-total on the PROM in step 412. In step 414, the sub-total is compared with the destination zip code prefix stored in memory. If the zip code sub-total result of the Δ ZIP iteration is greater than or equal to, that is, not less than the destination zip prefix stored in memory as shown in step 416, the data corresponding to the group or number of successive incremental steps is retrieved from memory and displayed in step 418. However, if the sub-total is less than the destination zip code prefix in step 416, then the sub-total is placed back on the address lines to the PROM to again be incremented in step 420.

For purposes of illustration, suppose that the destination zip prefix is 028. This destination zip in its binary form would be stored in memory in step 406. Then the starting address of the zip code chart 000 would be entered on the address lines to the PROM which would then output the first Δ ZIP value "9". The Δ ZIP-9 would be added to the zip sub-total, namely 000, to yield a new sub-total, namely 009, which would then be compared with the destination zip stored in memory. Since 009 is less than 028, the routine is begun again in step 420. The next Δ ZIP value is "9" which will be added to 009 to yield a sub-total of 018. The comparison of steps 414 and 416 shows that the sub-total is less than 028 and the routine is repeated a third time. The routine is repeated until the sixth iteration is performed in which Δ ZIP of 5 is added to a sub-total of 026. At this time the comparison shows that the new sub-total 033 is greater or equal to the destination zip code prefix. Accordingly, the data stored at the address of the sixth group, namely zone 2 is retrieved from the PROM and loaded into the display in step 418. This result corresponds to that shown by the data in Table II.

This incremental approach to zip code-to-zone conversion may also be practiced equally well by successively negatively incrementing or decrementing the destination zip code by the Δ ZIP values until the sub-total is less than the starting zip code address or zero. Decrementing continues in successive steps until the sub-total is less than or equal to zero which is then defined as the zip code starting address.

Both approaches to zip code-to-zone conversion described above may include an error routine such as that disclosed in the Check et al. Patent Application to indicate if an improper or invalid zip code prefix is entered in the apparatus. Further, an apparatus using a converter circuit adapted for either approach may be arranged with appropriate input connections for receiving information from a reprogramming computer 500 (See, for example, FIG. 1). In that way, the converter circuit can be reprogrammed while in the apparatus. However, it is desirable to incorporate a concealed safety switch or programming mode switch 502 in the apparatus to prevent a user from accidentally disturbing the program in an operating converter circuit. This programming mode switch 502 allows the PROM to be programmed from the keyboard, by sequentially entering in zone information and having the zip code prefix addresses automatically increment up through the prefix table if the unit employs the direct look-up approach. If the unit employs the Δ ZIP approach, the highest zip code prefix in each group and the Δ ZIP would be entered while the apparatus memory is indexed sequentially through its storage addresses.

As can be seen from the above description, it is apparent that either method will work equally well. However, the incremental method permits use of a PROM having fewer storage locations equal only to the number of successive groups such as those shown in Table II.

In the manufacture of any one of the aforementioned inventive embodiments, it would be extremely useful if all of these inventive apparatuses were made identical. This would save on manufacturing costs. One such saving can be achieved by making the zip code-to-zone converter logic to be programmable from an external source, i.e. manufactured with an initially blank ROM.

Such a scheme would require that a serviceman or a postal authority program the calculator with select information corresponding to the particular location of the user. In other words, the calculator would be programmed in the field with data having a predetermined format of zip code-to-zone information.

Figures 12A, 12B:
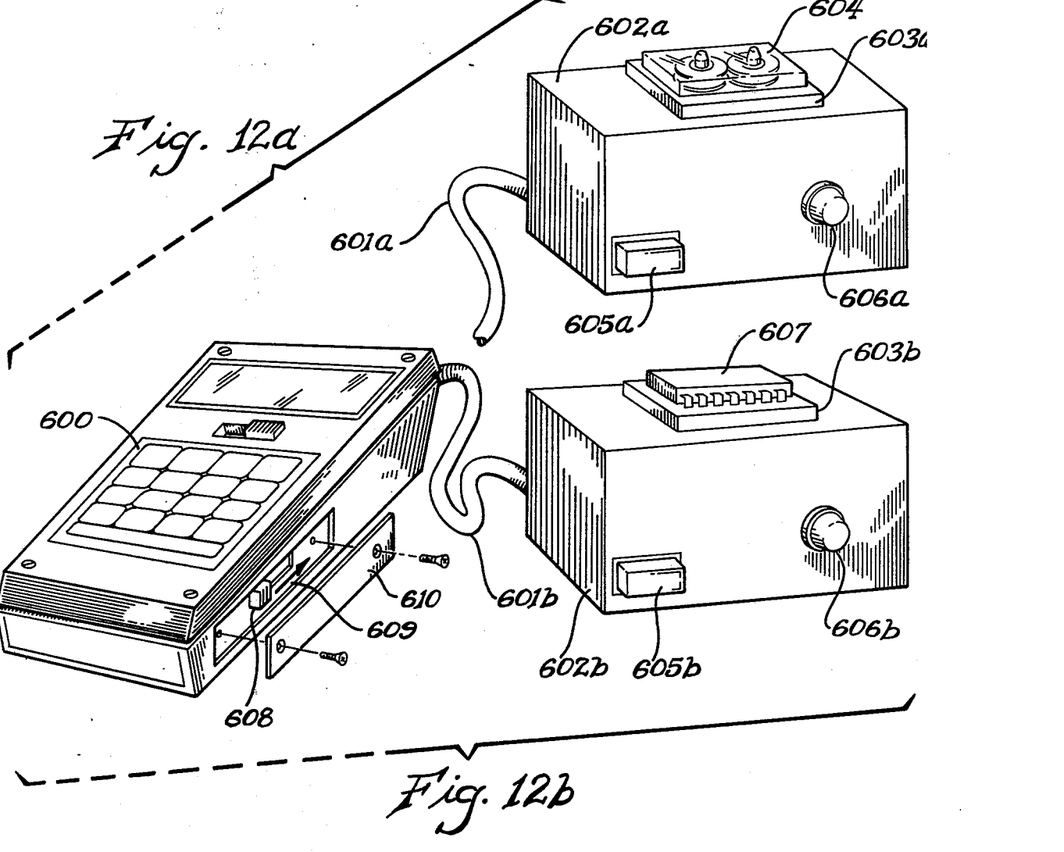
FIGS. 12a and 12b show a split perspective view of the inventive apparatus being programmed with select zip code-to-zone informatin from either of two external automatic programming devices.

FIGS. 12a and 12b depict the inventive calculator 600 having a jack (not shown) for receiving a jack plug and wire 601a or 601b connected to an external automatic programming device 602a and 602b, respectively. Either of the devices 602a or 602b will incrementally feed data to the calculator converter logic to program the calculator 600 with zip code-to-zone information.

The 602a device has a deck 603a for receiving a tape 604 containing the select program. When the start switch 605a is depressed, the tape 604 will play the information to the calculator 600. An indicator light 606a will flash on, when the programming has been completed.

The device 602b is similar to device 602a, but its deck 603b receives a master ROM 607. When the start button 605b is depressed, the date is incrementally fed via line and plug 601b to the calculator converter logic. An indicator lamp 606b will light when the programming is complete.

The calculator 600 has a hidden switch 608 which is not easily accessible for security reasons. The switch 608 is movable between a programming mode position and a run mode position. In the programming mode position, the calculator 600 cannot be operated in a zip code-to-zone conversion mode. The converter logic can only receive data in this switch position. This prevents interference with the data that is being transferred from the programming device.

After the calculator 600 has been programmed, the switch 608 is pushed (arrow 609) to the run mode, and the calculator can operate either as a mathematical calculator or a zip code-to-zone conversion calculator.

The panel 610 is then secured in place to hide switch 608 to prevent user tampering.

Figure 13:
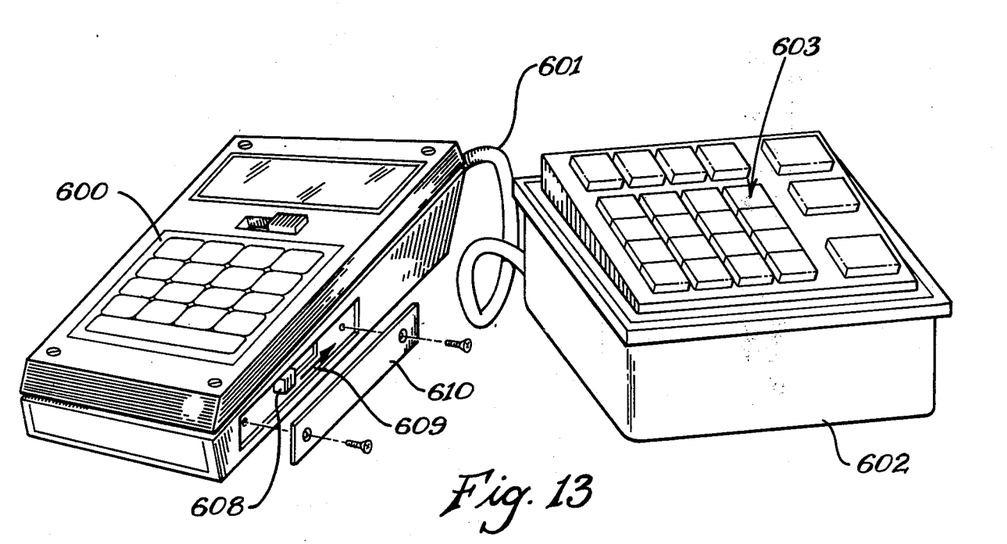
FIG. 13 is a perspective view of the inventive apparatus being programmed with select zip code-to-zone information from a manually operable external programming device.

FIG. 13 shows still another programming scheme. The calculator 600 is connectable to a programmer module 602 via line 601. Module 602 contains a keyboard 603 for keying in the zip code-to-zone information by hand. This type of module is manufactured by many companies, one of which is PRO-LOG Corporation, Monterey, Ca. (Model M-920).

After programming the calculator 600, the switch 608 is again moved (arrow 609) to the run mode, and the cover 610 is secured to hide the switch 608.

Calculator 600 can also be built such that switch 608 can connect the converter logic directly to its own keyboard for programming purposes. This would have the advantage of not requiring an external device to input zip code-to-zone data.

Although specific embodiments of the present invention have been described above in detail, it is to be understood that this is for purposes of illustration. Modifications may be made to the described structures by those skilled in the art in order to adapt these apparatus for performing mathematical calculations and for the converting of zip code information into zone information to particular applications.

What is claimed is:

1. An apparatus for converting postal zip code information into postal zone information and for performing mathematical calculations, said apparatus comprising:
  A. mathematical logic means for performing mathematical calculations and for operating said apparatus in a calculator mode;
  B. converter means for determining postal destination zone as a function of the postal destination zip code and for operating said apparatus in a zip code-to-zone conversion mode;
  C. switching means operatively connected between said logic means and said converter means for selectively
    1. enabling said logic means to operate said apparatus in a calculator mode; and
    2. enabling said converter means to operate said apparatus in a zip code-to-zone conversion mode;
  D. jack means for removably connecting said converter means and said apparatus to permit replacement of said converter means with another programmed for determination of postal destination zone as a function of postal destination zip code from a different postal origination location;
  E. a housing for supporting said mathematical logic means and said switching means; and
  F. a converter module for supporting said converter means, and further wherein said jack means comprises a jack plug and a jack plug receptacle for connecting said housing and said module, said module being connected with said housing when said jack plug is received in said jack plug receptacle.

2. The converting and calculating apparatus as claimed in claim 1 wherein said converter means is programmed to determine postal destination zone as a function of postal destination zip code from a single postal origination location.

3. The converting and calculating apparatus as claimed in claim 1 wherein said jack plug and said receptacle are mounted externally of said housing and said module, and therein said module is shaped and dimensioned to form an integral extension of said housing when mounted therewith by having said jack plug received in said jack plug receptacle.

4. The converting and calculating apparatus as claimed in claim 1 wherein the housing is formed with a converter module compartment shaped and dimensioned to receive said module via the interconnecting jack plug and receptacle.

5. The converting and calculating apparatus as claimed in claim 4 further comprising:
a hatch cover hinged with said housing to cover said compartment.

6. The converting and calculating apparatus as claimed in claim 4 further comprising:
a tray mounted slidably relative to said housing to cover said compartment.

7. The converting and calculating apparatus as claimed in claim 1 wherein said converter is programmable to determine postal destination zone as a function of postal zip code from one of a plurality of postal origination locations.

8. The converting and calculating apparatus as claimed in claim 1 further comprising:
means for displaying the results of mathematical calculations when said apparatus is operated through said switching means in the calculator mode, and for displaying the postal destination zone determined by said converter means corresponding to a given destination zip code when said apparatus is operated through said switching means in the zip code-to-zone conversion mode.

9. An apparatus for converting postal zip code information into postal zone information and for performing mathematical calculations, said apparatus being selectively programmable with zip code to postal zone information, said apparatus comprising:
A. mathematical logic means for performing mathematical calculations and for operating said apparatus in a calculator mode;
B. a external program means for connection with a converter means;
C. converter means for determining postal destination zone as a function of the postal destination zip code and for operating said apparatus in a zip code-to-zone conversion mode, said converter means having a jack for connection with said external program means, said converter means being programmable from said external program means to provide the conversion means with select zip code to postal zone information; and
D. switching means operatively connected to said mathematical logic means and said converter means for selectively
1. enabling said logic means to operate said apparatus in a calculator mode; and
2. enabling said converter means to operate said apparatus in a zip code-to-zone conversion mode.

10. The apparatus of claim 9, further comprising a second switching means operatively connected to said converter means and said mathematical logic means for selectively
1. operating said apparatus in a run mode comprising the calculator mode and the conversion mode; and
2. operating said apparatus in a programming mode, wherein said converter means is programmed with select zip code to postal zone information.

11. An apparatus for converting postal zip code information into postal zone information and for performing mathematical calculations, said apparatus being selectively programmable with zip code to postal zone information, said apparatus comprising:
A. a keyboard for inputting data into said apparatus;
B. mathematical logic means connected to said keyboard for performing mathematical calculations and for operating said apparatus in a calculator mode;
C. converter means connected to said keyboard for determining postal destination zone as a function of the postal destination zip code and for operating said apparatus in a zip code-to-zone conversion mode, said converter means being programmable from said keyboard to provide the conversion means with select zip code to postal zone information;
D. a first switching means operatively connected to said mathematical logic means and said converter means for selectively
1. enabling said logic means to operate said apparatus in a calculator mode; and
2. enabling said converter means to operate said apparatus in a zip code-to-zone conversion mode; and
E. a second switching means operatively connected to said converter means for switching said converter means to a program mode, whereby the apparatus is programmed with said select zip code to postal zone information from said keyboard.

* * * * *